(12) United States Patent
Kobayashi et al.

(10) Patent No.: US 6,975,960 B2
(45) Date of Patent: Dec. 13, 2005

(54) METHOD FOR EVALUATING WAFER CONFIGURATION, WAFER, AND WAFER SORTING METHOD

(75) Inventors: Makoto Kobayashi, Fukushima (JP); Syuichi Kobayashi, Fukushima (JP)

(73) Assignee: Shin-Etsu Handotai Co., Ltd., Tokyo (JP)

( * ) Notice: Subject to any disclaimer, the term of this patent is extended or adjusted under 35 U.S.C. 154(b) by 14 days.

(21) Appl. No.: 10/488,689

(22) PCT Filed: Sep. 6, 2002

(86) PCT No.: PCT/JP02/09096

§ 371 (c)(1),
(2), (4) Date: Mar. 5, 2004

(87) PCT Pub. No.: WO03/025999

PCT Pub. Date: Mar. 27, 2003

(65) Prior Publication Data

US 2004/0215418 A1  Oct. 28, 2004

(30) Foreign Application Priority Data

Sep. 14, 2001 (JP) ............................ 2001-280500

(51) Int. Cl.$^7$ ............................................. G01B 11/24
(52) U.S. Cl. ....................................... 702/167; 438/14
(58) Field of Search ................................ 702/167, 150,
702/155, 81; 438/14, 780, 693, 689, 690–692,
438/691, 626; 451/41, 487, 5, 287, 56; 51/175;
118/728; 414/404; 700/223, 121; 257/E21.53

(56) References Cited

U.S. PATENT DOCUMENTS

| | | | | |
|---|---|---|---|---|
| 4,510,176 A | * | 4/1985 | Cuthbert et al. | ............ 438/780 |
| 5,400,548 A | * | 3/1995 | Huber et al. | ............ 451/41 |
| 6,712,673 B2 | * | 3/2004 | Albrecht et al. | ............ 451/41 |
| 6,828,163 B2 | * | 12/2004 | Kobayashi et al. | ............ 438/14 |
| 6,852,012 B2 | * | 2/2005 | Vepa et al. | ............ 451/41 |
| 6,861,360 B2 | * | 3/2005 | Wenski et al. | ............ 438/693 |

FOREIGN PATENT DOCUMENTS

| | | |
|---|---|---|
| JP | 2000-260840 A1 | 9/2000 |
| JP | 2001-185537 A1 | 7/2001 |

OTHER PUBLICATIONS

International Search Report for PCT/JP02/09096 mailed on Jan. 14, 2003.

* cited by examiner

*Primary Examiner*—Michael Nghiem
*Assistant Examiner*—Xiuqin Sun
(74) *Attorney, Agent, or Firm*—Rader, Fishman & Grauer PLLC

(57) ABSTRACT

A method for evaluating a wafer configuration includes: obtaining plural wafer configuration profiles from a central wafer portion to an edge portion along the entire periphery at a prescribed angular space; providing a first region for calculating a reference line for each profile in the central side of the wafer; calculating the reference line in the first region; providing a second region in the peripheral side of the wafer outside the first region; extrapolating the reference line calculated in the first region to the second region; analyzing a value obtained by subtracting the reference line value in the second region from an actually measured value in the second region; calculating the maximum value among the values as a surface characteristic and the minimum value among the values as a surface characteristic; and, evaluating configuration uniformity in the peripheral portion of the wafer from plural surface characteristics and surface characteristics.

14 Claims, 12 Drawing Sheets

METHOD FOR EVALUATING WAFER CONFIGURATION, WAFER, AND WAFER SORTING METHOD

TECHNICAL FIELD

The present invention relates to a method for evaluating a configuration of a wafer represented by a silicon wafer, a wafer suitable for an exposure system and a sorting method for a good quality wafer.

BACKGROUND ART

Recently, an integration level in a semiconductor device has been becoming increasingly higher because of the remarkable progress in the semiconductor device technology, and with this progress, a demand for quality of a silicon wafer or the like has also been becoming more severe. As one of the important characteristics required to the silicon wafer as described above, there is an issue about surface configurations. This is because a higher integration level of a semiconductor device has brought about miniaturization of a device size, and for instance, slight undulation or the like on a silicon wafer may lead to faults in a device pattern during the photolithography step or other steps. In addition, in order to effectively use a wafer, there is required a wafer which has excellent high flatness up to the utmost outer peripheral portion (the very limit of the chamfered portion) of its main surface.

There have been conventionally used site flatness based on the front side reference, SFQR (Site Front Least Square Range) and others as the index for evaluating flatness of the wafer mentioned above. SFQR is a sum of absolute values of the respective maximum displacements in the plus side and minus side from the reference plane which is a flat plane in a site obtained by calculating data with the method of least squares, which is evaluated for each site. A size of the site is generally 20 mm square or 25 mm square.

DISCLOSURE OF THE INVENTION

Improvements have also been realized on precision, etc. of an exposure system along with the progress of the high integration level as described above, while troubles have frequently occurred that the exposure system stops in the course of patterning on a wafer.

These troubles have been considered caused by a factor of the exposure system, and an influence of a fine configuration of a wafer used in the exposure system as well. However, the wafer is of a level which becomes no issue when evaluated with an index such as SFQR; therefore, a clear cause for the troubles has been unknown. Consequently, there has arisen a necessity for evaluating a wafer configuration using a factor other than SFQR to supply a wafer not causing the troubles in the exposure system.

When evaluated with SFQR or the like as described above, in particular, flatness in an inner side portion of the wafer is evaluated with good precision, whereas there is a case where exact evaluation is not always assured in a peripheral portion of the wafer, especially in the vicinity of a boundary between a chamfer portion and a main surface of the wafer.

With the foregoing difficulties of the prior art in view, it is an object of the present invention to provide a method for evaluating a configuration of a wafer from a different viewpoint from the conventional SFQR or the like, a wafer with less troubles in an exposure system or the like, and a sorting method for a good quality wafer.

In order to achieve the above object, a method for evaluating a wafer configuration of the present invention comprises the following steps of: obtaining plural wafer configuration profiles of from the central portion of a wafer to the edge portion thereof along the entire periphery thereof at a prescribed angular space; providing a first region for calculating a reference line for each of the profiles in the central side of the wafer; calculating the reference line in the first region; further providing a second region in the peripheral side of the wafer outside the first region; extrapolating the reference line calculated in the first region to the second region; analyzing a value (an actually measured value−a reference value) obtained by subtracting the reference line (the reference value) in the second region from a configuration (the actually measured value) in the second region; calculating the maximum value among the values as a surface characteristic A and the minimum value among the values as a surface characteristic B; and evaluating configuration uniformity in the peripheral portion of the wafer from plural surface characteristics A and surface characteristics B obtained along the entire peripheral portion of the wafer.

In the conventional SFQR or the like, a wafer surface is divided into areas (sites) each about 20 mm square or about 25 mm square in which a reference plane is prepared for evaluation, but in this case, since a reference plane is prepared in a narrow area, the SFQR was averaged within the plane; it is often impossible to perform exact evaluation on deterioration of an actual configuration or the like. Especially, in this conventional evaluating method, a configuration of the peripheral portion of the wafer cannot be evaluated accurately.

A surface characteristic A (hereinafter also referred to as A parameter) and a surface characteristic B (hereinafter also referred to as B parameter) obtained by the method for evaluating a wafer configuration according to the present invention can preferably perform very exact evaluation of a surface configuration in the peripheral portion of the wafer. Especially, by analyzing plural surface characteristics A and surface characteristics B obtained along the peripheral portion of the wafer as performed in the present invention, configuration uniformity in the peripheral portion of the wafer can be evaluated. At this time, it is preferable to evaluate the configuration uniformity in the peripheral portion of the wafer from a difference between the maximum value and the minimum value of the plural surface characteristics A obtained in the peripheral portion of the wafer (this configuration uniformity in the peripheral portion is referred to as A parameter peripheral portion uniformity).

Furthermore, at this time, it is preferable to evaluate the configuration uniformity in the peripheral portion of the wafer from a difference between the maximum value and the minimum value of the plural surface characteristics B obtained in the peripheral portion of the wafer (this configuration uniformity in the peripheral portion is referred to as B parameter peripheral portion uniformity).

More preferably, a difference between the surface characteristic A and the surface characteristic B (a surface characteristic (A−B)) is obtained from each of the profiles in advance, and the configuration uniformity in the peripheral portion of the wafer is evaluated from a difference between the maximum value and the minimum value of the plural surface characteristics (A−B) obtained in the wafer surface (this configuration uniformity in the peripheral portion of the wafer is hereinafter referred to as (A−B) parameter peripheral portion uniformity). Moreover, the configuration uniformity in the peripheral portion of the wafer may be evaluated with standard deviations of plural surface characteristics A, surface characteristics B or differences therebetween (surface characteristics (A−B)) obtained in the peripheral portion of the wafer as variations.

Here, the wafer configuration measured with a prescribed space within the wafer surface is displacement (height or roughness) in the direction vertical to the wafer surface or a wafer thickness. Evaluation on the displacement in the direction vertical to the wafer surface makes it possible to perform evaluation based on the front side reference. Further, evaluation on the wafer thickness makes it possible to perform evaluation based on the back side reference.

The prescribed space described above is preferably 1 mm or less (but in excess of 0 mm).

The prescribed angular space to obtain wafer configuration profiles is preferably 1 degree or less (but in excess of 0 degree).

Especially, an index for the configuration uniformity in the peripheral portion of the wafer can be obtained by attaining plural surface characteristics A and surface characteristics B along the entire periphery (along the peripheral portion of the wafer).

Further detailed description will be given of the method for evaluating a wafer configuration of the surface characteristics A and surface characteristics B. In the method according to the present invention, as shown in FIG. 1, a reference line is prepared in a global (extensive) region (a first region) for calculating a reference line from a wafer configuration (each of profiles), and the reference line is used by being extrapolated to a region (a second region) to be evaluated such as the peripheral portion of the wafer for analyzing the surface characteristics of the second region, the surface characteristics of the region being evaluated. Measuring a value obtained by subtracting the reference line from the actual configuration (an actually measured value−a reference value), the calculated maximum value is evaluated as a rise (A in FIG. 1) and the calculated minimum value as a sag (B in FIG. 1).

In other words, in the method according to the present invention, without the use of the conventional SFQR or the like wherein evaluation is performed on each site, a reference line is prepared in an extensive specified region (a first region) on a wafer surface, which is an area larger than the site size to be evaluated by the SFQR or the like; the surface characteristics in a region to be evaluated (a second region) other than the first region is evaluated based on the reference line prepared in the extensive specified region (the first region).

A wafer most suitable for an exposure system can be defined by performing the method for evaluating a wafer configuration of the present invention. A yield in the exposure system (such as a misalignment occurrence frequency in a device pattern) is mainly due to the surface characteristic A. In a preferable wafer, an average value of its surface characteristics A is smaller than 150 nm. As for an abnormal stop or the like of the system, it became clear that frequent abnormal stops or the like occur in a case where there is locally present a large change in values of the surface characteristic B obtained by evaluating the peripheral portion of the wafer according to the method for evaluating a wafer configuration of the present invention. To be concrete, frequent abnormal stops occurred in a case where a difference of the maximum value and the minimum value of plural surface characteristics B obtained within the wafer surface (the B parameter peripheral portion uniformity) is larger than 600 nm. Therefore, a wafer most suitable for the exposure system has the difference of 600 nm or less.

Moreover, when evaluation is performed with a difference between a surface characteristic A and a surface characteristic B, that is a surface characteristic (A−B), wafers to be used in the exposure system can be precisely sorted into good wafers and poor wafers. That is to say, a wafer suitable for the exposure system has the difference between the maximum value and the minimum value of plural surface characteristics (A−B) obtained within the wafer surface (the (A−B) parameter peripheral portion uniformity) of preferably 500 nm or less and more preferably 400 nm or less.

Note that those values of the above surface characteristics A and B are evaluated by using data with a boundary (an arbitrary position X) between the first region and the second region at a position having a distance of 30 mm from the peripheral portion of the wafer excluding 1 mm of the peripheral portion of the wafer (excepting a chamfer portion).

The wafer described above has not extreme sags and local sags in the peripheral portion of the wafer when evaluated with the surface characteristics A and B.

While there are conceivably a variety of wafer manufacturing processes for manufacturing the above wafer, for example, where a wire saw is used in a slicing step, slicing is performed such that no abnormal cutting-in by a wire occurs in the peripheral portion of the wafer. In an etching step, a contact area of a wafer with an etching drum for supporting the wafer is minimized. In a case including a surface grinding step, no grinding striation is generated. Sags in the peripheral portion of the wafer due to lapping are prevented from generating. There are available a process for manufacturing a wafer under controlling a polishing pressure on the peripheral portion of the wafer in a polishing step and other steps. As described above, various improvements can be attained in steps of a wafer manufacturing process, and hence no specific limitation is imposed on the manufacturing process for the wafer.

Even when a wafer is manufactured by means of various methods as described above, it is difficult to perfectly manufacture wafers falling within the range above described; therefore there are sorted wafers each having a difference between the maximum value and the minimum value of the plural surface characteristics B (the B parameter peripheral portion uniformity) of 600 nm or less obtained by the use of the method for evaluating a wafer configuration, the sorted wafers being preferably used in an exposure system.

Furthermore, there are preferably sorted wafers each having a difference between the maximum value and the minimum value of the obtained plural surface characteristics (A−B) (the (A−B) parameter peripheral portion uniformity) of 500 nm or less, the sorted wafers being used in an exposure system. More preferably, there are sorted wafers each having a difference between the maximum value and the minimum value of the obtained plural surface characteristics (A−B) (the (A−B) parameter peripheral portion uniformity) of 400 nm or less, the sorted wafers being used in an exposure system.

Thus, by the use of the method for evaluating a wafer configuration of the present invention, wafers are sorted and the sorted wafers are used in an exposure system; abnormal stops or the like of the exposure system may be remarkably reduced.

BEST MODE FOR CARRYING OUT THE INVENTION

Embodiments of the method for evaluating a wafer configuration according to the present invention are described in detail below with reference to the accompanying drawings.

Figure 2:
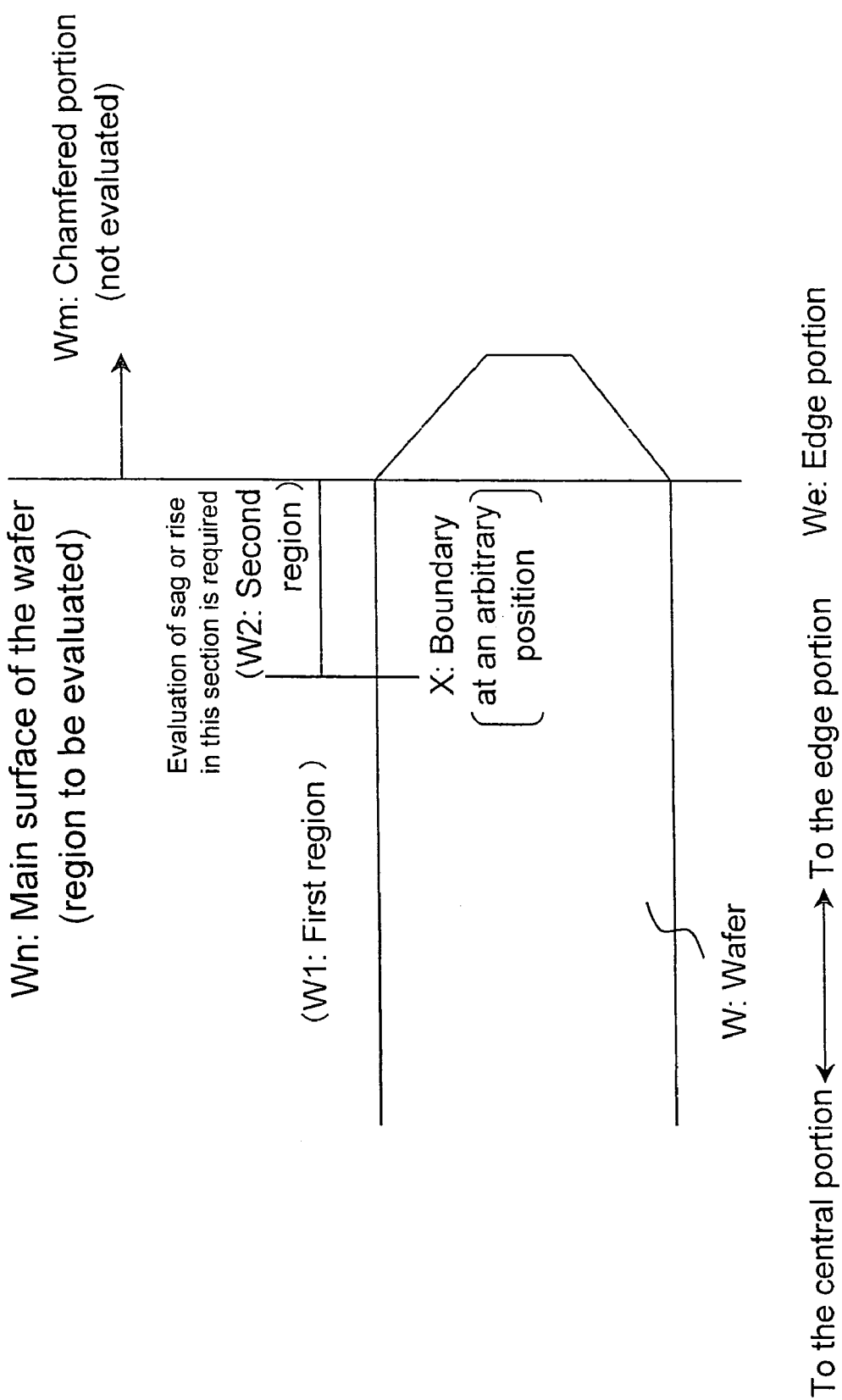
FIG. 2 is an explanatory view showing a first region and a second region in the method for evaluating a wafer configuration according to the present invention.

FIG. 2 shows schematically a configuration of a wafer W. Generally, a peripheral edge portion of the wafer W is chamfered to prevent cracking or the like, a chamfered portion Wm being formed. Usually, this chamfered portion Wm is ignored in evaluating a wafer configuration, and out of an object of measurement.

Evaluating a wafer configuration (a wafer profile) is often performed on a region of a main surface Wn of the wafer W which is formed by excluding an area with the width of about 3 mm or about 2 mm from the chamfered portion Wm of the wafer W. However, recently it is required to evaluate the region which is formed by excluding an area with the width of 1 mm from the chamfered portion or the region to the very limit of the boundary between the main surface and the chamfered portion. Therefore, while there is no limitation on the evaluation region (especially, the excluding area), considering measuring precision and the analyzed data precision, in the present state it is preferable to evaluate the region formed by excluding an area with the width of about 1 mm.

Figure 1:
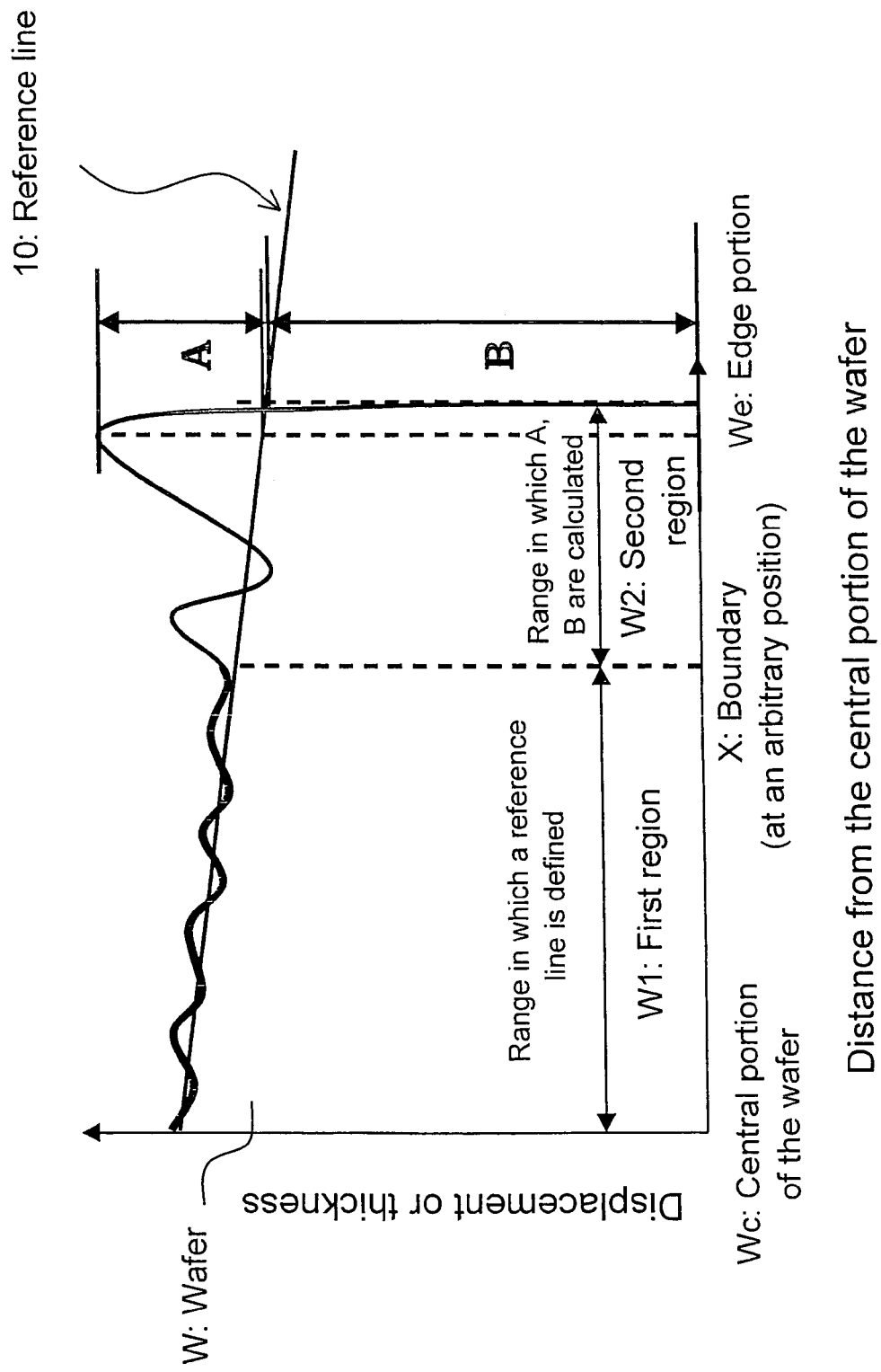
FIG. 1 is an explanatory view showing schematically three-dimensional relations between a reference line and a first region and a second region in the method for evaluating a wafer configuration according to the present invention.

FIG. 1 schematically shows displacement in thickness of a surface of the wafer W. A main purpose of the method for evaluating a wafer configuration according to the present invention is to quantify rises or sags which are easily generated on an area with the width of about 10 mm of the peripheral portion of the wafer (10 mm from the chamfered portion Wm).

In the method for evaluating a wafer configuration according to the present invention, as shown in FIG. 1, a reference line 10 is prepared within an extensive region (a first region) W1 for calculating the reference line in a wafer surface from the basic configuration of the wafer W; the reference line 10 is extrapolated to a region (a second region) W2 to be evaluated on the peripheral portion of the wafer, and is used thereon for analyzing the surface characteristics of the second region W2 for analyzing the surface characteristics of the region W2.

A value (an actually measured value–a reference value) obtained by subtracting the reference line 10 (a reference value) from an actual configuration (an actually measured value) of the wafer is measured, and the measured maximum value is evaluated as rises A, the measured minimum value being evaluated as sags B. It is to be noted that, in FIG. 1, designated by Wc is a central portion of a wafer, We is an edge portion of the wafer, and X is a boundary between the first region W1 and the second region W2, which is provided at an arbitrary position.

Figure 3:
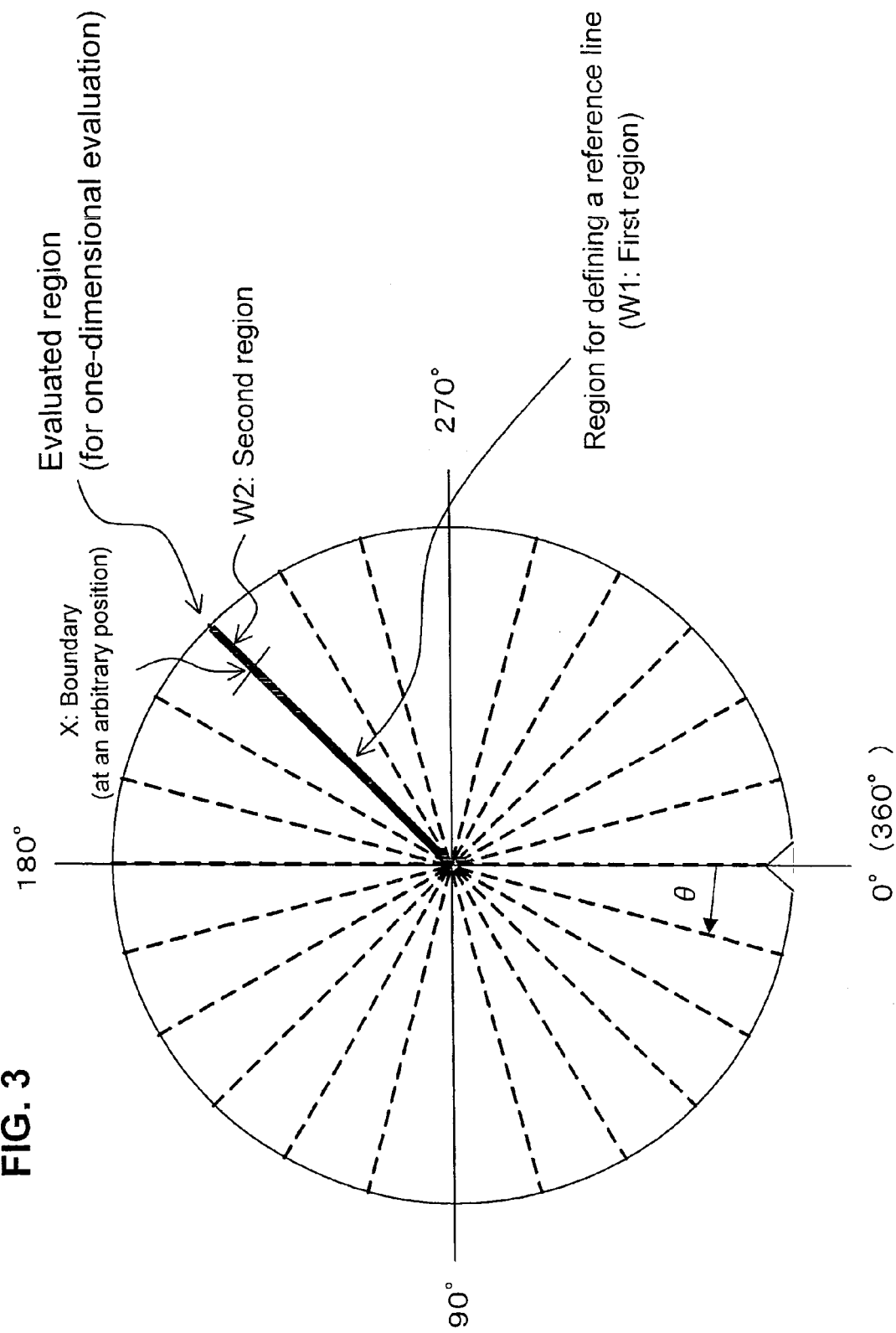
FIG. 3 is an explanatory view showing an example of a region for evaluation in the method for evaluating a wafer configuration according to the present invention.

In the method for evaluating a wafer configuration by preparing a reference line, a configuration of a wafer is measured with a prescribed space on a surface of the wafer; the measured wafer configuration is successively stored; a configuration profile of from the central portion Wc of the wafer W to the edge portion We thereof as shown in FIG. 3 is obtained from the stored configuration; there is calculated a reference line up to a boundary X of the first region W1 provided at an arbitrary position away from the central portion (in the radial direction of the wafer); and then a difference between a configuration (an actually measured value) at an arbitrary position (in the direction of the wafer thickness) and a value (a reference value)of the reference line 10 at this position is analyzed to be calculated as the surface characteristics.

The prescribed measurement space on the wafer surface should be preferably within 1 mm. The space is naturally more than 0 mm, but by performing evaluation with the smallest possible space, more accurate configuration can be quantified.

The reference line may be approximated by a straight line or a curved line most well reflecting a configuration of the central portion of the wafer W, but usually the central portion of the wafer W is polished to a high flatness level, so that the reference line is fully approximated by the straight line.

Here, an arbitrary position X of a boundary between the first region W1 and the second region W2 is preferably provided at an arbitrary position in the radial direction of the wafer W and in an area (an area where the first region is as extensive as possible) of the wafer W where no peripheral sag nor rise is generated. For instance, usually sags and the like occur in the area outside of about 10 mm away from the peripheral edge of the wafer, so that the arbitrary position (boundary) X should preferably be provided at a position of about 30 mm away from the peripheral edge of the wafer. It is preferable to prepare a reference line or a reference plane at a position of 70 mm away from the central portion of the wafer in the case of an 8 inch wafer (200 mm in diameter) and at a position of 120 mm away from the central portion in the case of a 12 inch wafer (300 mm in diameter). However, this position may be freely changed so that the wafer quality can be evaluated most accurately.

In the method of calculating the specific surface characteristics to be evaluated by preparing a reference line, a configuration profile of a wafer W of from the central portion Wc to the edge portion We is obtained; a reference line of from the central portion Wc to an arbitrary position X is calculated; then there is analyzed a value obtained by subtracting a reference line at an arbitrary position in the range of from the arbitrary position X to the edge portion We from a configuration at this position [a configuration at an arbitrary position (an actually measured value)−a reference line at an arbitrary position (a reference value)]; and the maximum value among the analyzed values (usually the positive maximum displacement amount or the maximum thickness difference) is calculated as the surface characteristic A (rises). This surface characteristic A quantitatively indicates a rising configuration on the peripheral portion of the wafer.

Also, a configuration profile of from the central portion Wc of the wafer W to the edge portion We is obtained; a reference line of from the central portion to an arbitrary position X is calculated; then there is analyzed a value obtained by subtracting a reference line at an arbitrary position in the range of from the arbitrary position X to the edge portion We from a configuration at this position [a configuration at an arbitrary position (an actually measured value)−a reference line at an arbitrary position (a reference value)]; and the minimum value among the analyzed values (usually the negative maximum value) is calculated as the surface characteristic B (sags). This surface characteristic B quantitatively indicates a sagging configuration on the peripheral portion of the wafer.

In the present invention, in order to evaluate the whole wafer, providing a plurality of radial measuring positions as indicated by the dotted line in FIG. 3, configuration profiles of from the wafer central portion Wc to the edge portion We (excluding the chamfer portion Wm) are obtained for each given angular space ($\theta$), and such a one-dimensional analysis is performed for each of the configuration profiles, thereby the surface characteristics A and B being obtained.

As a result, plural surface characteristics A and B are obtained along the wafer peripheral portion. It is especially preferable to analyze a configuration profile radially along about 400 lines (at an angular space of about 1 degree or less) within the wafer surface. While the value of the angular space is naturally in excess of 0 degree, very exact evaluation can be performed in the wafer peripheral portion with the angular space of 1 degree or less. Note that it is preferable to perform evaluation excluding parts including a notch, an orientation flat and a letter printed with a laser mark because the parts cause abnormal data easily.

More exact evaluation can be performed than in a conventional wafer configuration evaluation by using surface characteristics A and B. In addition, evaluation can be performed on configuration uniformity in the wafer peripheral portion by analyzing surface characteristics A and B along the wafer peripheral portion..

Figure 11:
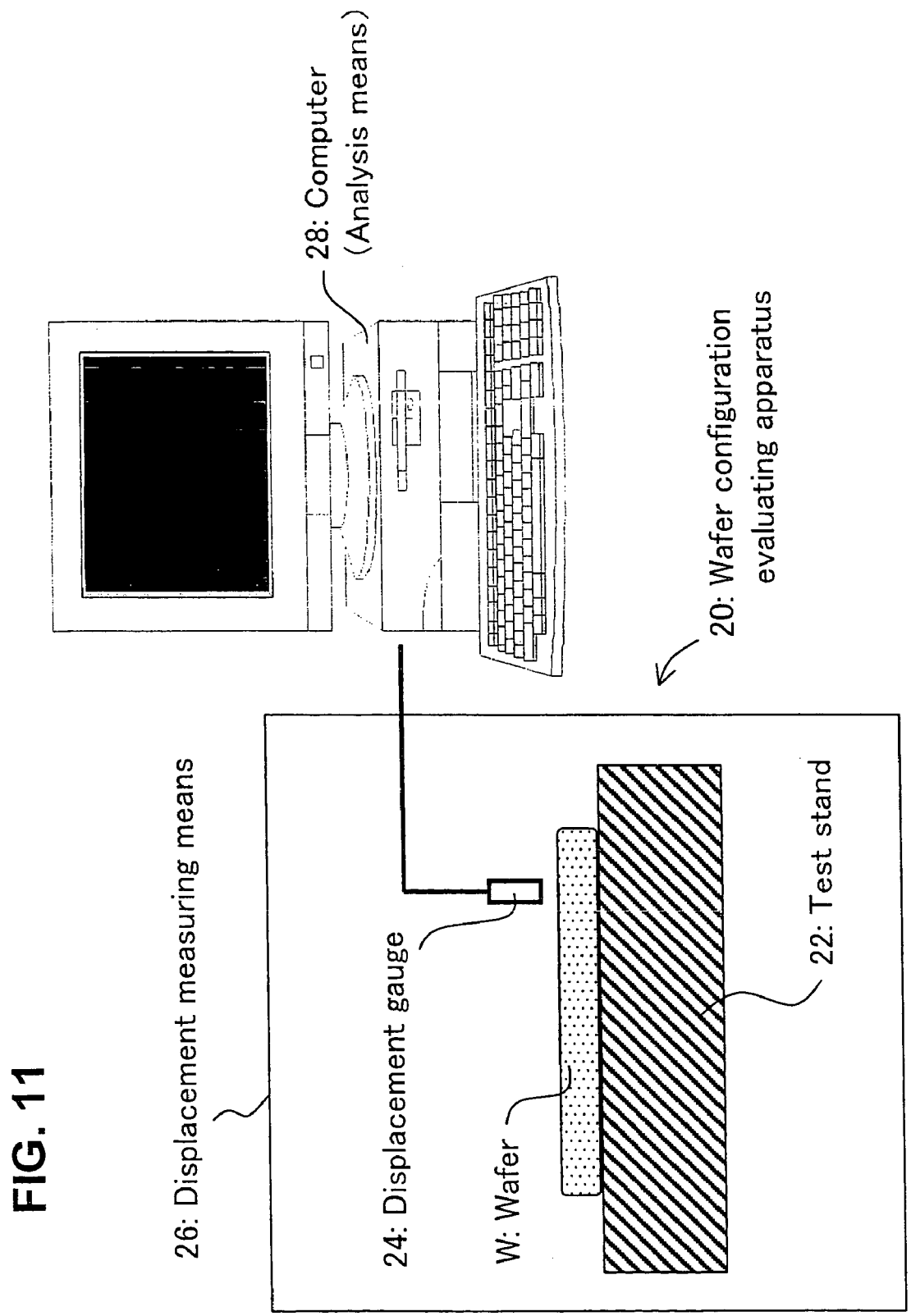
FIG. 11 is a schematic side view showing an essential structure of a first embodiment of an apparatus for evaluating a wafer configuration according to the present invention.

Next, an evaluating apparatus for performing the above evaluation is described below. FIG. 11 is a schematic explanatory view showing an essential structure of the apparatus for evaluating wafer configuration according to the present invention. An apparatus 20 for evaluating a wafer configuration shown in FIG. 11 is an apparatus used for measurement and analysis of displacement of a surface of a wafer W, which comprises a test stand 22, and a displacement measuring unit 26 having a displacement gauge 24 equipped with a laser oscillator or an automatic focusing mechanism, a computer 28, etc., and optically measures shifts in the distance from the previously calibrated reference point as the displacement. In the embodiment shown in FIG. 11, the displacement measuring unit 26 functions as a configuration measuring unit.

The test stand 22 is a stand used for placing thereon a silicon wafer W as an object to be measured. The displacement gauge 24 is an apparatus for irradiating a laser beam with a prescribed space onto a surface of a silicon wafer W placed on the test stand 22, and for instance, a HeNe laser or the like is used as the laser beam. The displacement gauge 24 is equipped with an automatic focusing mechanism (not shown), and this automatic focusing mechanism is provided with, for instance, a CCD (Charge Coupled Device) camera (not shown), an automatic focusing circuit (not shown), and others, and can automatically focus on an image reflected from the silicon wafer of the laser beam which is emitted from the laser oscillator.

The displacement gauge 24 measures the displacement from a reference point when focused by the automatic focusing mechanism, and inputs the displacement data into the computer 28.

The computer 28 is equipped with a CPU (Central Processing Unit), an RAM (Random Access Memory), an ROM (Read Only Memory), etc. The computer 28 into which the displacement data output from the displacement gauge 24 are input, reads the analysis program stored in the ROM using the RAM as a work area, and calculates the surface characteristics A and B of the wafer quality according to the present invention from the input displacement data with the CPU. The surface characteristics are parameters especially used for evaluation of a peripheral portion of the wafer.

In other words, the computer 28 comprises a storage means for successively inputting and storing configuration data obtained by the displacement measuring unit (the configuration measuring unit) 26, and a surface characteristic calculating unit for reading a configuration data (an actually measured value) of from the central portion of the wafer W to the edge portion thereof from the storage device, calculating a reference line (a reference value) from the central portion of the wafer to an arbitrary portion, then analyzing a value (an actually measured value−a reference value) obtained by subtracting the reference line or the reference plane from an arbitrary position, and calculating the analyzed difference as the surface characteristics.

Figure 12:
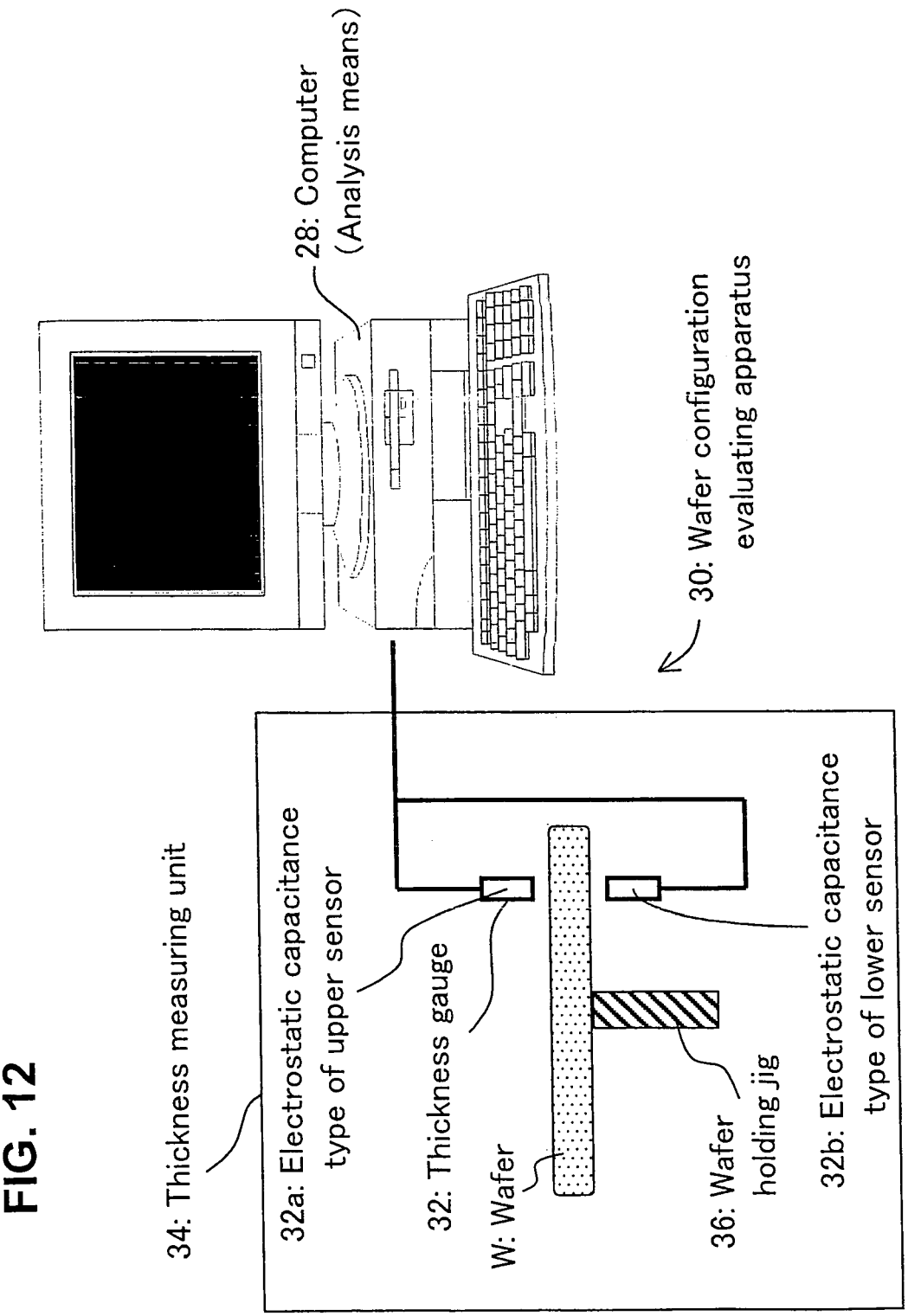
FIG. 12 is a schematic side view showing an essential structure of a second embodiment of an apparatus for evaluating a wafer configuration according to the present invention.

FIG. 12 is a schematic explanatory view showing an essential structure of another embodiment of the apparatus for evaluating a wafer configuration according to the present invention. In another embodiment for the apparatus for evaluating a wafer configuration, a thickness may be measured with a flatness measuring unit based on an electrostatic capacitance system in place of displacement of the wafer surface. The flatness measuring unit based on the electrostatic capacitance system is used as a thickness measurement unit 34 equipped with a thickness gauge 32 comprising electrostatic capacitance type of upper and lower sensors 32a, 32b arranged such that the wafer W is held between them as shown in FIG. 12, and measures the thickness of the wafer W by measuring the distances between the sensors 32a, 32b and upper and lower surfaces of the wafer W, respectively. As the flatness measuring unit based on the electrostatic capacitance system, a commercial non-contact type of wafer thickness, flatness and BOW/WARP measuring unit such as Ultra Gauge 9900 produced by ADE Corp. may be used.

The apparatus 30 for evaluating a wafer configuration shown in FIG. 12 comprises a wafer holding jig 36 for holding a wafer W, the above mentioned thickness measuring unit 34, and a computer 28, and is used for measuring a thickness of the wafer W. In the embodiment shown in FIG. 12, the thickness measuring unit 34 functions as a configuration measuring unit.

Thus, any type of evaluating apparatus may be used without any specific limitation, provided that it can finely and accurately evaluate configurations (irregularities) of the wafer W.

The surface characteristics A and B are evaluated on the basis of the displacement or thickness measured as described above. Specifically, the reference line is a line calculated by means of the method of least squares and other methods. Therefore, as to the space with which data are to be sampled, the finer, the better. Specifically, a proper range for the space should be 1 mm or less.

Next, the configuration evaluation using the surface characteristics A and B actually calculated by the apparatus for evaluating a wafer configuration according to the present invention is described below. FIG. 1 is a view showing values for the surface characteristics A and B of a prescribed wafer, and a configuration profile on a cross section thereof. In an analysis program of the surface characteristics calculating means, an equation for calculating the surface characteristics A and B is programmed for each profile. Furthermore, the analysis program is a software evaluating an average value, a standard deviation, a maximum value and a minimum value of plural surface characteristics A, B or (A−B) obtained from profiles along a peripheral portion of the wafer.

In the analysis program, as for the surface characteristic A, thickness data of a mirror polished silicon wafer are read with an arbitrary space (about 1 mm) on the silicon wafer from the central portion thereof toward the edge portion; then a reference line is prepared using the thickness data in an extensive first region by means of the method of least squares; a difference between the reference line and a configuration in a second region to be evaluated is calculated, and the maximum value within the area is analyzed.

As for the surface characteristic B, thickness data of a mirror polished silicon wafer are read with an arbitrary space (about 1 mm) on the silicon wafer from the central portion thereof toward the edge portion; then a reference line is prepared using the thickness data in an extensive first region by means of the method of least squares; a value obtained by subtracting the reference line from a configuration in a second region to be evaluated is calculated, and the minimum value within the area is analyzed.

The analysis described above is conducted on each profile along the peripheral portion of the wafer. By analyzing surface characteristics A and B obtained from the plural profiles, uniformity (variation) of a configuration in the peripheral portion of the wafer is evaluated. To be concrete, evaluation is performed on an average value, a standard deviation, a maximum value, a minimum value and others of surface characteristics A and B or a difference between the surface characteristic A and the surface characteristic B (hereinafter may be referred to as a surface characteristic (A−B) or (A−B) parameter).

With the apparatus for evaluating a wafer configuration according to the present invention described above, by reading into a computer and analyzing displacement data measured using a laser beam, or thickness data measured with an electrostatic capacitive type thickness measuring instrument, there can be calculated surface characteristics A and B, configuration uniformity in the peripheral portion and others.

As described above, according to the present invention, a surface configuration of a wafer, especially a peripheral portion thereof can be evaluated accurately on the basis of a specific standard from a different viewpoint from the conventional techniques such as SFQR. In addition, by obtaining and analyzing plural surface characteristics A or B along the peripheral portion of the wafer, evaluation on configuration uniformity of the wafer peripheral portion can be realized. It is possible to obtain more effective information as compared to the conventional evaluation for the wafer configuration, and hence problems in a device fabricating process such as a process using an exposure system and others can be solved. Moreover, the surface characteristics can be fully used as parameters for analysis of various experimental data, too.

EXAMPLES

The present invention will be further described more detailedly by way of the following examples which should be construed illustrative rather than restrictive.

Example 1

Description will be given of an example of the configuration evaluation method of the present invention. In this example, evaluation was conducted on an 8-inch mirror-polished wafer (200 mm in diameter and 0.5 mm in width of a peripheral edge portion being a chamfered portion) manufactured in a common manufacturing process. The wafer is referred to as S1.

In the configuration evaluation, the wafer thickness was measured at positions with a space of 0.95 mm on the whole surface of the wafer (excluding the chamfered portion of an area with 0.5 mm in width of the peripheral portion); the measured wafer thickness data were successively stored; configuration profiles of the wafer of from the central portion to the edge portion (98.5 mm away from the central portion) as shown in FIG. 1 were read from the stored wafer thickness data; a reference line was calculated using the values from the central portion (in the direction of the wafer diameter) to an arbitrary position X (70 mm away from the central portion and 30 mm away from the edge portion) by the method of least squares; then the difference between the thickness at the arbitrary position and the value of the reference line (a virtual thickness) at the same position was analyzed; and the analyzed difference was calculated as the surface characteristics. In other words, the surface characteristics A and B are the maximum value and minimum value in the second region to be evaluated of 70 mm to 98.5 mm, respectively These values were analyzed using plural profiles from the center portion of the wafer to the edge portion thereof in radial directions. Actually, an analysis was performed on 400 profiles obtained at a prescribed angular space($\theta$).

Then, there ware analyzed the surface characteristics A and B obtained from the profiles. While the surface characteristics A and B have 400 values, evaluation thereof was performed excluding 13 values thereof which were obtained from profiles intersecting a notch.

Figure 4:
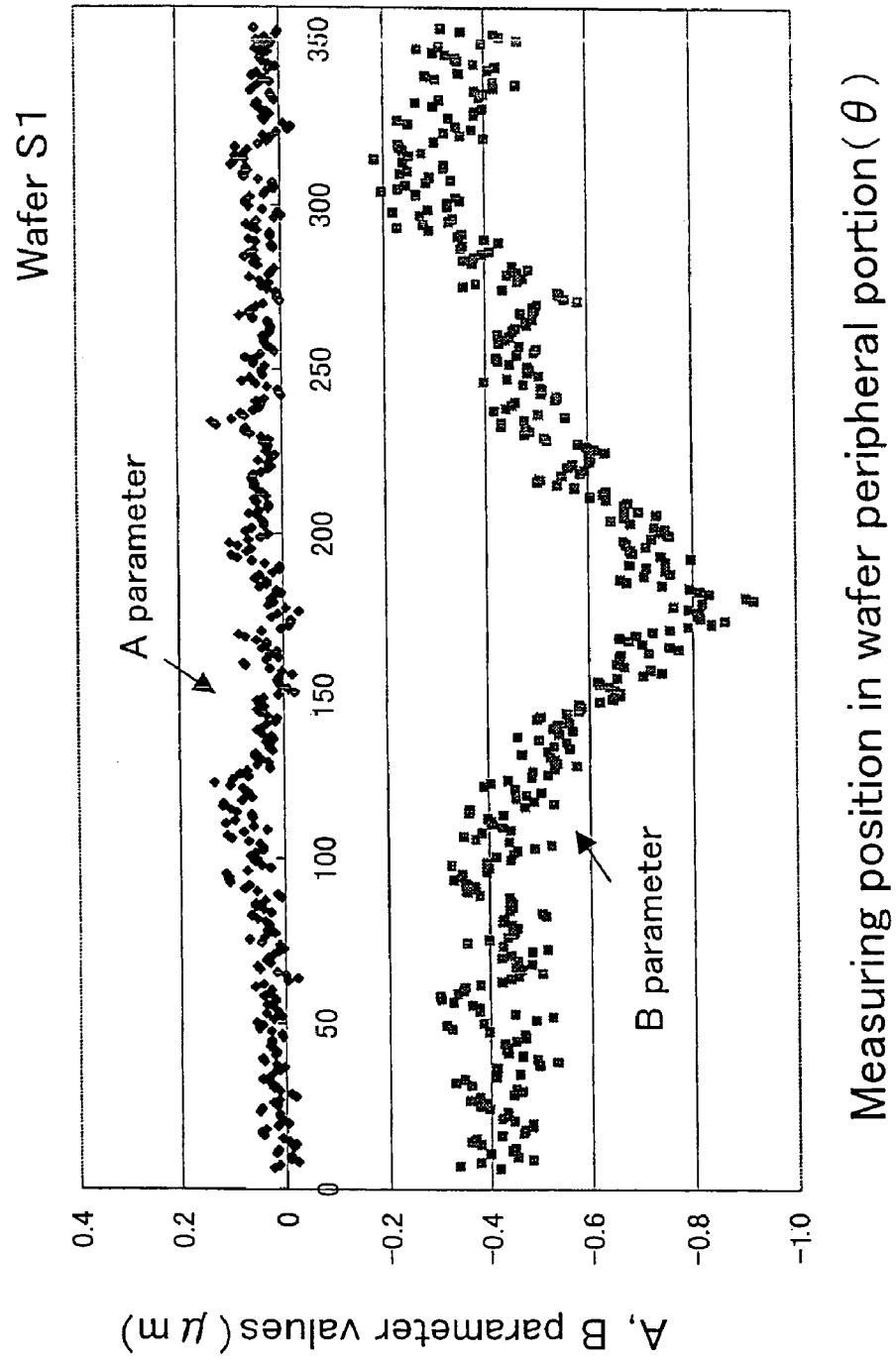
FIG. 4 is a graph showing relations between a measurement point in a peripheral portion of a wafer S1 and each of A and B parameter values in Example 1.

In FIG. 4, there are shown changes in A and B parameter values at evaluation positions for the evaluated surface characteristics. The abscissa of FIG. 4 indicates the evaluated position $\theta$. The position $\theta$ is obtained by plotting values evaluated rotating the wafer in the range of 360 degrees in the clockwise direction at the notch as 0 degrees. The ordinate indicates the A and B parameter values in μm unit.

With such forms as shown in FIG. 4, there can be confirmed uniformity in the peripheral portion of the wafer based on the surface characteristics A and B. In the wafer evaluated this time, a large change in the B parameter is observed at a position almost opposite (180 degrees) to the notch.

Note that in a case where the wafer S1 was loaded into an exposure system, the system stopped frequently. As the exposure system, a stepper (a common name of a stepping projection exposure system) was used in which the wafer is repeatedly stepped and exposed to a projected image of a mask pattern (a reticle pattern). As the exposure system, there may be used a scanning exposure system. The present inventors have seriously investigated the abnormal stop of the stepper and conceived that the stop may be greatly influenced by the uniformity in a peripheral portion of the B parameter obtained using the above method for evaluating the wafer configuration.

This is considered because if there is a large change in the B parameter (local sags) in a wafer as shown in FIG. 4, a focus of the exposure system is displaced which makes impossible of control by auto-focusing, so that a focus error arises to stop the system abnormally.

Therefore, evaluation was performed on an average value, a standard deviation, a maximum value, a minimum value and (a maximum value–a minimum value) of plural surface characteristics A, B or (A–B). Results of the evaluation are shown in Table 1. While changes (variations) in the parameter can be visually observed when the graph as shown in FIG. 4 is prepared, quantitative evaluation can also be performed by obtaining (the maximum value–the minimum value), the standard deviation and others. In the present invention, evaluation can be performed quantifying uniformity of the configuration in a peripheral portion of the wafer.

TABLE 1

Example 1 Evaluation Results: Uniformity of Configuration in Wafer Peripheral Portion (measurement object: wafer S1)

|  | Maximum (μm) | Minimum (μm) | Maximum – Minimum (μm) | Average (μm) | Standard deviation (μm) |
| --- | --- | --- | --- | --- | --- |
| A parameter | 0.135 | −0.029 | 0.164 | 0.038 | 0.028 |
| B parameter | −0.183 | −0.919 | 0.736 | −0.480 | 0.143 |
| (A − B) parameter | 0.942 | 0.223 | 0.719 | 0.518 | 0.141 |

Example 2

In order to confirm the above findings, evaluation was performed on wafers manufactured in plural different wafer manufacturing processes by means of the above method for evaluating a wafer configuration. To be concrete, wafers were manufactured altering wafer manufacturing processes so as to decrease a uniformity value of a peripheral portion in the B parameter.

Generally, the wafer manufacturing process comprises, a slicing step of slicing the single crystal ingot with a wire saw or the like to obtain a thin and disk-shaped wafer; a chamfering step of chamfering a peripheral edge portion of the wafer obtained through the slicing step to prevent cracking and chipping of the wafer; a lapping step of flattening this wafer; a flattening step of surface grinding or the like; an etching step that removes machining deformation remaining behind in the so chamfered and flattened wafer; a polishing step of making a mirror surface of the wafer; and a cleaning step of cleaning the polished wafer to remove an abrasive slurry or dust particles deposited thereon.

Various methods are conceived as the above steps in the manufacturing process to improve uniformity of the peripheral portion in the B parameter. For example, as an improvement in the slicing step, it is not to make irregular cut-in in the peripheral portion of the wafer by a wire when using a wire saw and the like. It is also to slice the wafer so as to improve a wafer configuration such as a bow and a sori. For the purpose, there are methods for controlling a slurry temperature, a feed rate of a wire and others.

As an improvement in the chamfering step, it is to perform grinding and mirror-chamfering while taking care of uniformity in chamfering. For this end, it is to perform the chamfering so as to control uniformly a contact pressure of a grindstone, a buff or the like. It is also to control it with the number of rotation of the wafer and the grindstone (buff) or the like.

As an improvement in the etching step, it is to take care of uniformity of etching. Especially, the etching is performed controlling uniformly streams of the etchant. For this end, there is a method to control the speed of rotation of an etching drum and others. It is also to improve it by reducing a contact area between the etching drum supporting wafers and the wafers.

As an improvement in the surface grinding step or the lapping step, it is to machine the wafer controlling spark-out because work damages and the like are easily generated when a fixed grindstone or a lapping table are sparked out after the lapping is over. In the surface grinding, adjustment is made on a grain size of the grindstone, a rotation speed thereof, a feed speed thereof so as to generate grinding striations at the lowest level possible. There are also available a method to remove the grinding striations by adopting low damage lapping and other methods.

As improvements in the polishing step, there are following measures: adjustments of a polishing pressure applied on a peripheral portion of a wafer in polishing, that is a change in a size of a work holding plate, polishing such that the central portion of a work holding region is of a harder quality while a peripheral portion thereof is of a softer quality and the peripheral portion is vacuum-chucked; and a back surface coat is formed on a back surface of a work, the work is held via the back surface coat and a front surface of the work is polished, wherein thickness of the back surface coat is different between the peripheral portion and the central portion in polishing. By changing a polishing pressure on the peripheral portion with the above methods, peripheral sags can be controlled. There is also usable a polishing method in which a pushing pressure applied on a work peripheral portion is controlled independently of the central portion by changing a polishing head.

In this example, the above improving methods are combined mainly with a process including a slicing step; a chamfering step; a surface grinding step; an etching step; a low damage lapping step; and a polishing step to obtain wafers S2, S3 and S4 manufactured by three different wafer manufacturing processes.

Figure 5:
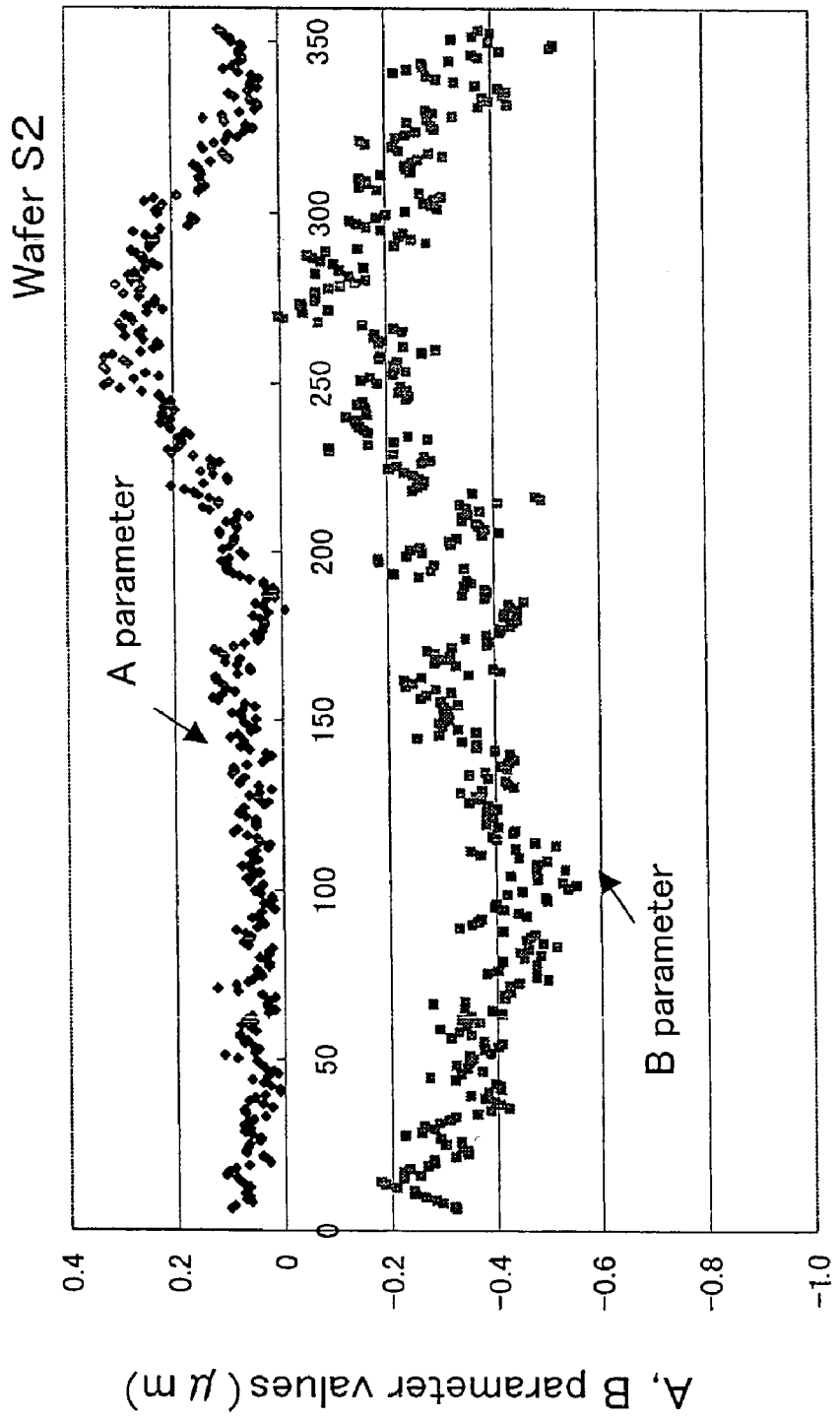
FIG. 5 is a graph showing relations between a measurement point in a peripheral portion of a wafer S2 and each of A and B parameter values in Example 2.
Figure 6:
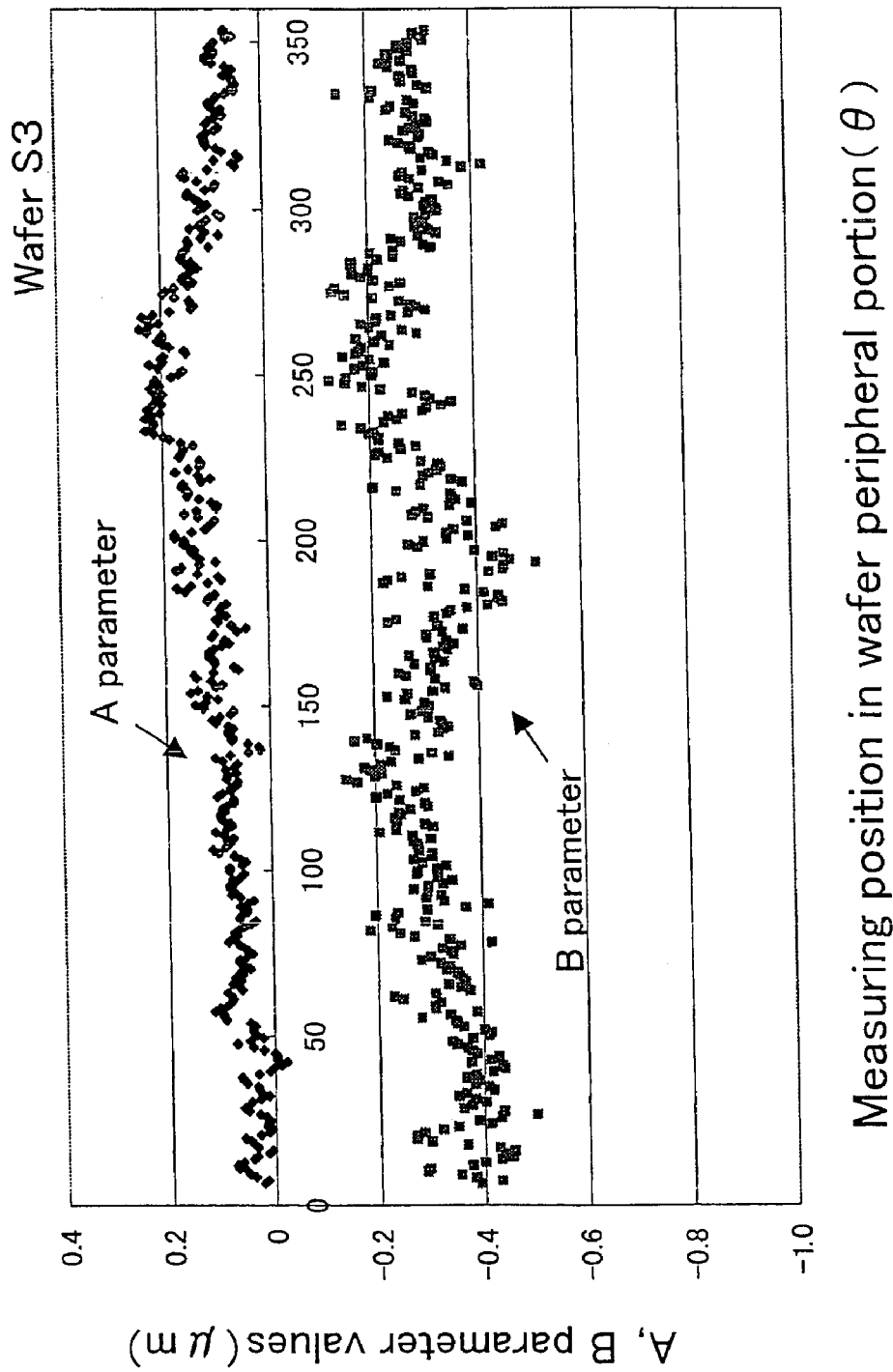
FIG. 6 is a graph showing relations between a measurement point in a peripheral portion of a wafer S3 and each of A and B parameter values in Example 2.
Figure 7:
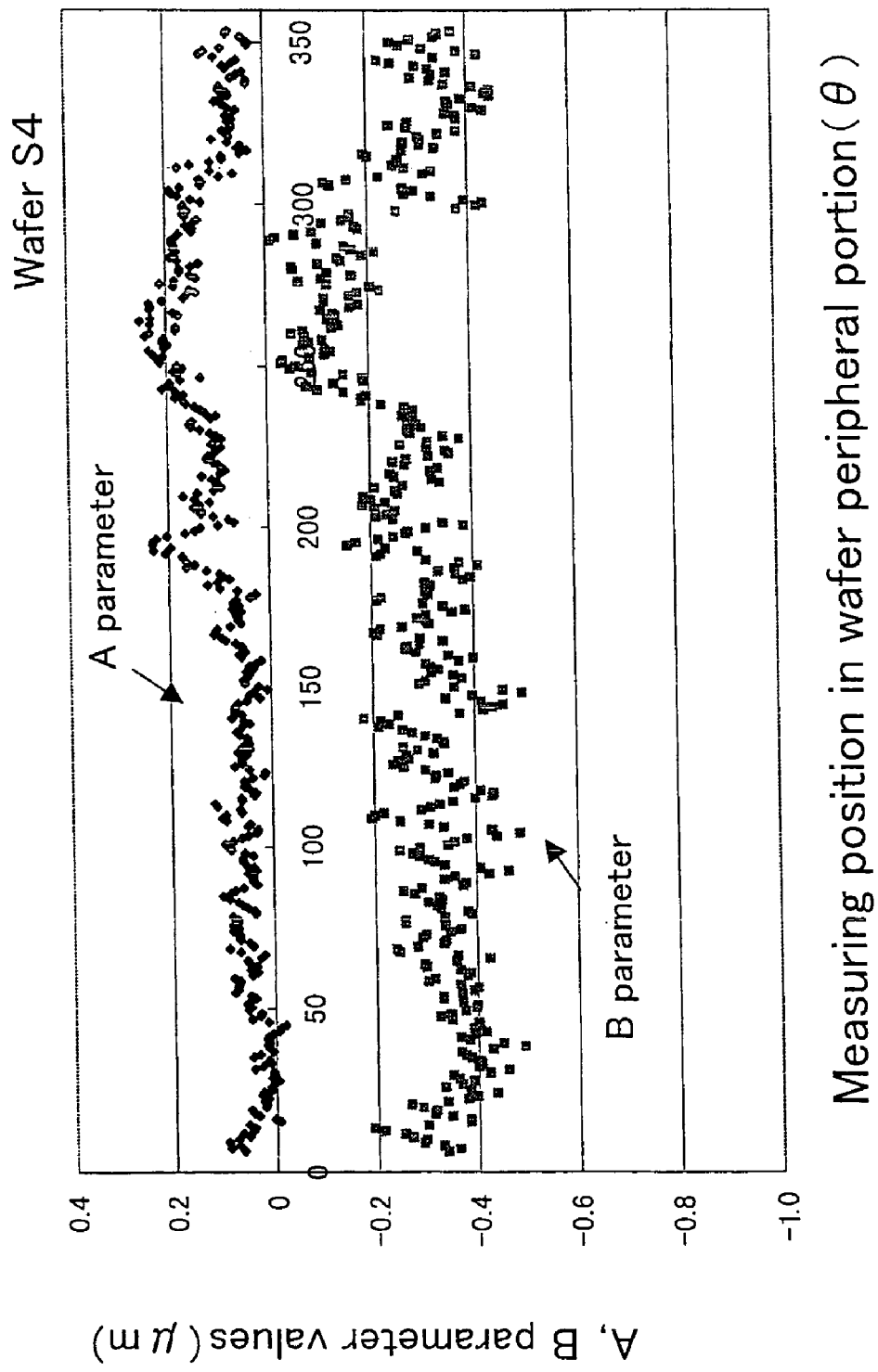
FIG. 7 is a graph showing relations between a measurement point in a peripheral portion of a wafer S4 and each of A and B parameter values in Example 2.

The wafers were evaluated according to the method for evaluating a wafer configuration of the present invention to obtain graphs of FIG. 5 (wafer S2), FIG. 6 (wafer S3) and FIG. 7 (wafer S4) in respect of the above three processes. A wafer configuration evaluation method is the same as in Example 1.

Moreover, quantitative evaluation was performed on the average value, the standard deviation, the maximum value, the minimum value, and (the maximum value–the minimum value) of the surface characteristic A, the surface characteristic B or the surface characteristic (A–B) of each wafer. Results of the evaluation are shown in Tables 2 to 4. The above wafers were loaded into a stepper, no abnormal stop of the apparatus being observed. As to the wafers, as can be seen from Table 3, a difference between the maximum value and the minimum value of plural surface characteristics B (peripheral portion uniformity in the B parameter) obtained on each wafer was 600 nm or less, that is 556 nm, 390 nm and 486 nm, respectively. Furthermore, as can be seen from Table 4, uniformity of a peripheral portion in the surface characteristic (A–B) was 500 nm or less, that is 419 nm, 404 nm and 380 nm. These wafers S2, S3 and S4 were good in a process using a stepper.

TABLE 2

A Parameter Peripheral Portion Uniformity

| | Maximum ($\mu$m) | Minimum ($\mu$m) | Maximum – Minimum ($\mu$m) | Average ($\mu$m) | Standard deviation ($\mu$m) |
|---|---|---|---|---|---|
| Wafer S2 (Example 2) | 0.330 | −0.007 | 0.337 | 0.110 | 0.079 |
| Wafer S3 (Example 2) | 0.241 | −0.024 | 0.265 | 0.104 | 0.055 |
| Wafer S4 (Example 2) | 0.253 | −0.020 | 0.272 | 0.093 | 0.060 |
| Wafer S5 (Comparative Example 1) | 0.105 | −0.028 | 0.132 | 0.032 | 0.024 |
| Wafer S1 | 0.135 | −0.029 | 0.164 | 0.038 | 0.028 |

TABLE 3

B Parameter Peripheral Portion Uniformity

| | Maximum ($\mu$m) | Minimum ($\mu$m) | Maximum – Minimum ($\mu$m) | Average ($\mu$m) | Standard deviation ($\mu$m) |
|---|---|---|---|---|---|
| Wafer S2 (Example 2) | 0.002 | −0.553 | 0.556 | −0.309 | 0.111 |
| Wafer S3 (Example 2) | −0.124 | −0.515 | 0.390 | −0.300 | 0.073 |
| Wafer S4 (Example 2) | −0.008 | −0.494 | 0.486 | −0.288 | 0.100 |
| Wafer S5 (Comparative Example 1) | −0.253 | −0.935 | 0.682 | −0.509 | 0.154 |
| Wafer S1 | −0.183 | −0.919 | 0.736 | −0.480 | 0.143 |

TABLE 4

(A – B) Parameter Peripheral Portion Uniformity

| | Maximum ($\mu$m) | Minimum ($\mu$m) | Maximum – Minimum ($\mu$m) | Average ($\mu$m) | Standard deviation ($\mu$m) |
|---|---|---|---|---|---|
| Wafer S2 (Example 2) | 0.636 | 0.251 | 0.384 | 0.419 | 0.074 |
| Wafer S3 (Example 2) | 0.619 | 0.215 | 0.404 | 0.404 | 0.069 |
| Wafer S4 (Example 2) | 0.579 | 0.195 | 0.385 | 0.380 | 0.070 |
| Wafer S5 (Comparative Example 1) | 0.930 | 0.282 | 0.648 | 0.541 | 0.157 |
| Wafer S1 | 0.942 | 0.223 | 0.719 | 0.518 | 0.141 |

Comparative Example 1

Then, evaluation was performed on a wafer manufactured in a common wafer manufacturing process as Comparative Example 1. The wafer manufacturing process comprises, a slicing step of slicing the single crystal ingot to obtain a thin and disk shaped wafer; a chamfering step of chamfering a peripheral edge portion of the wafer obtained through the slicing step to prevent cracking and chipping of the wafer; a lapping step of flattening this wafer; an etching step that removes machining deformation remaining behind in the so chamfered and lapped wafer; a polishing step of making a mirror surface of the wafer; and a cleaning step of cleaning the polished wafer to remove an abrasive slurry or dust particles deposited thereon. The wafer manufactured from the common wafer manufacturing process was referred to as S5.

Figure 8:
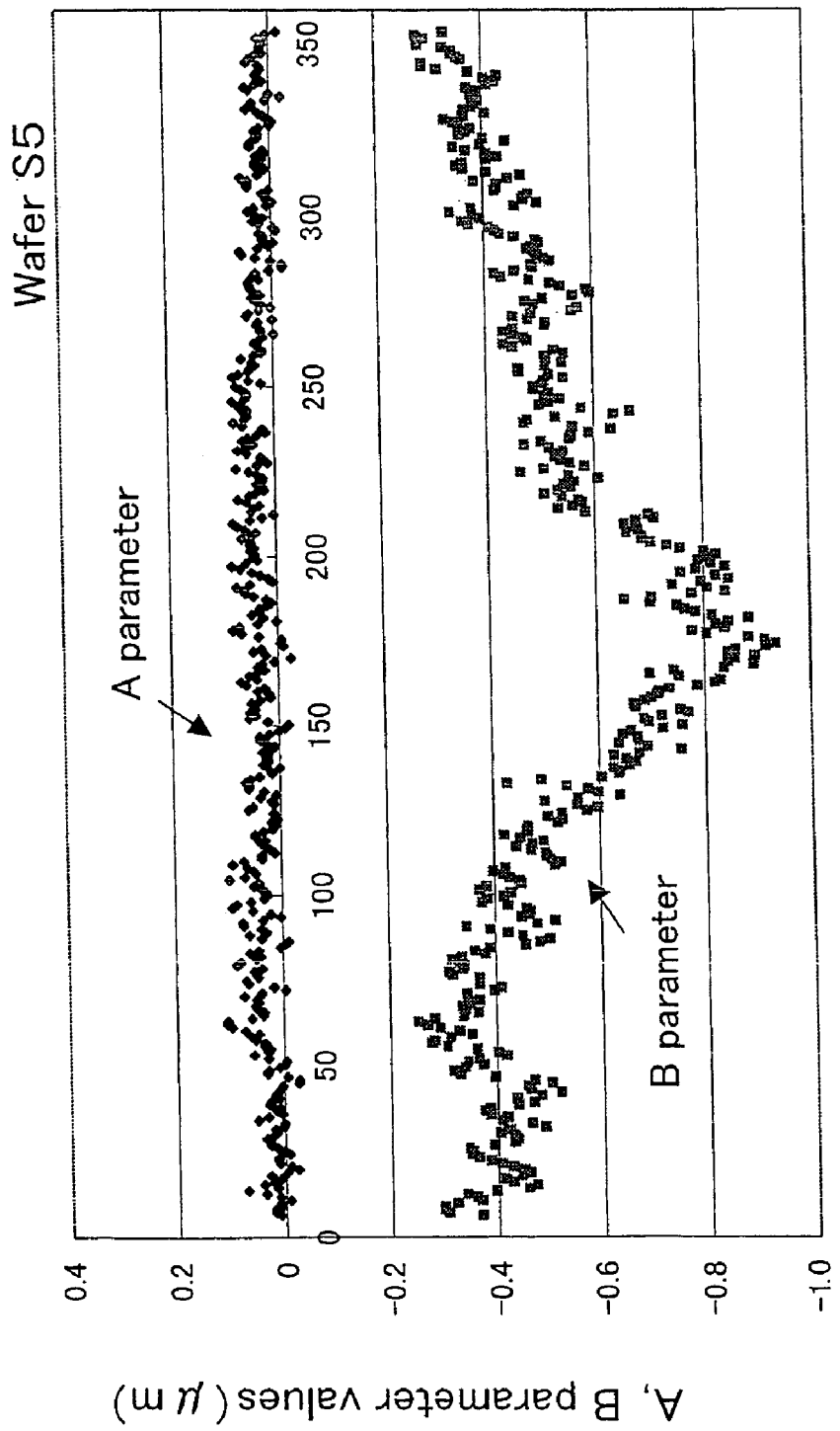
FIG. 8 is a graph showing relations between a measurement point in a peripheral portion of a wafer S5 and each of A and B parameter values in Comparative Example 1.

Evaluation was performed on the wafer S5 according to the method for evaluating a wafer configuration of the present invention so as to obtain a graph as shown in FIG. 8. Furthermore, quantified evaluation results are additionally shown in Tables 2 to 4. A configuration evaluation method is the same as Example 1.

The wafer S5 was loaded into a stepper with the result that abnormal stop of the stepper was observed at a rate of 100%. A difference between the maximum value and the minimum value (the B parameter peripheral portion uniformity) of plural surface characteristics B obtained on a wafer was 682 nm. Uniformity of a peripheral portion in the surface characteristic (A–B) was 648 nm. Evaluation results of the wafer S1 evaluated in Example 1 are also additionally shown in Tables 2 to 4. Abnormal stop of the stepper was also observed with the wafer S1. Thus, the wafers S1 and S5 were poor in a process using the stepper. It is found that a local change in the B parameter exerts a large influence on stop of the apparatus.

Figure 9:
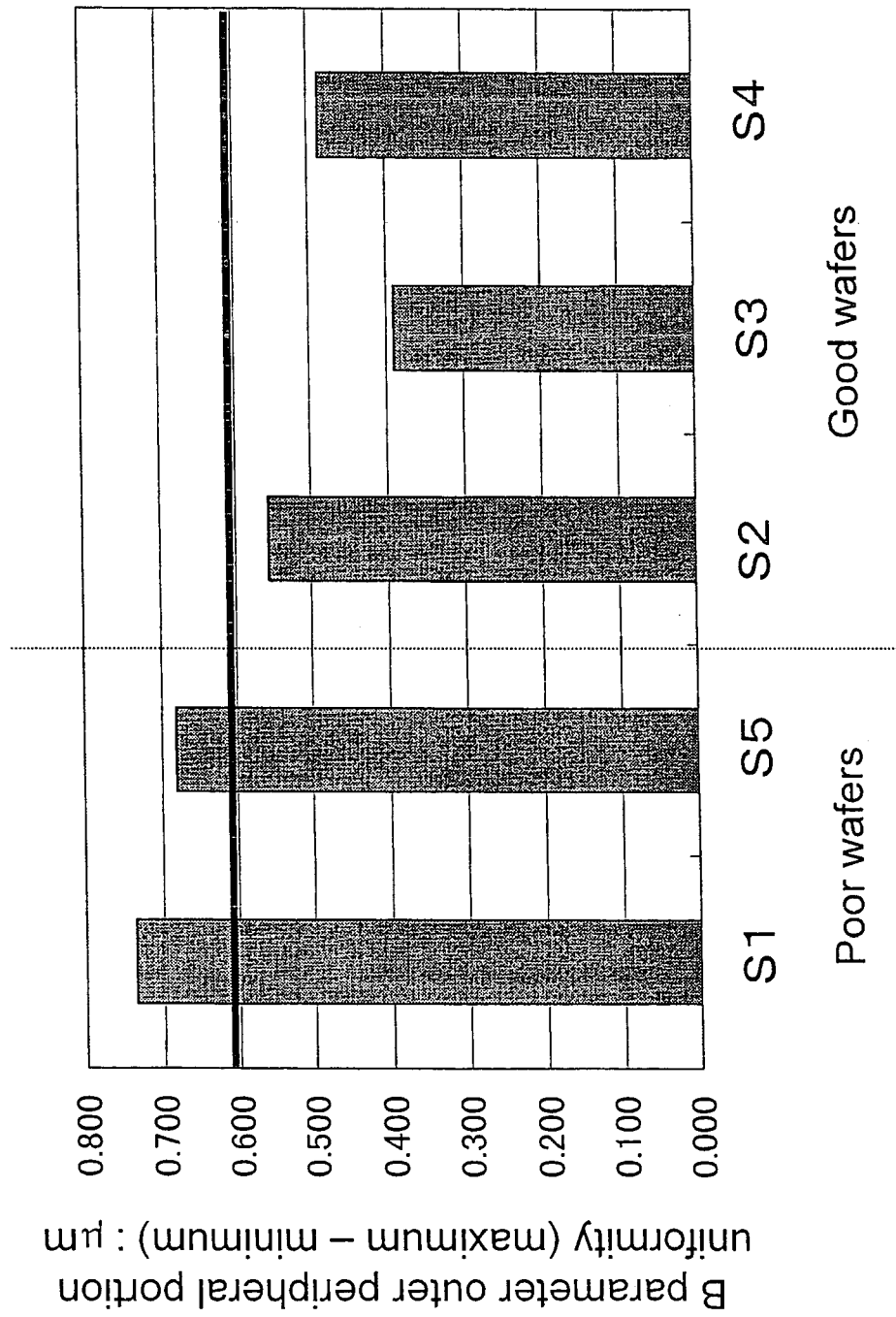
FIG. 9 is a graph showing B parameter peripheral portion uniformity in each of the wafers S1 to S5.
Figure 10:
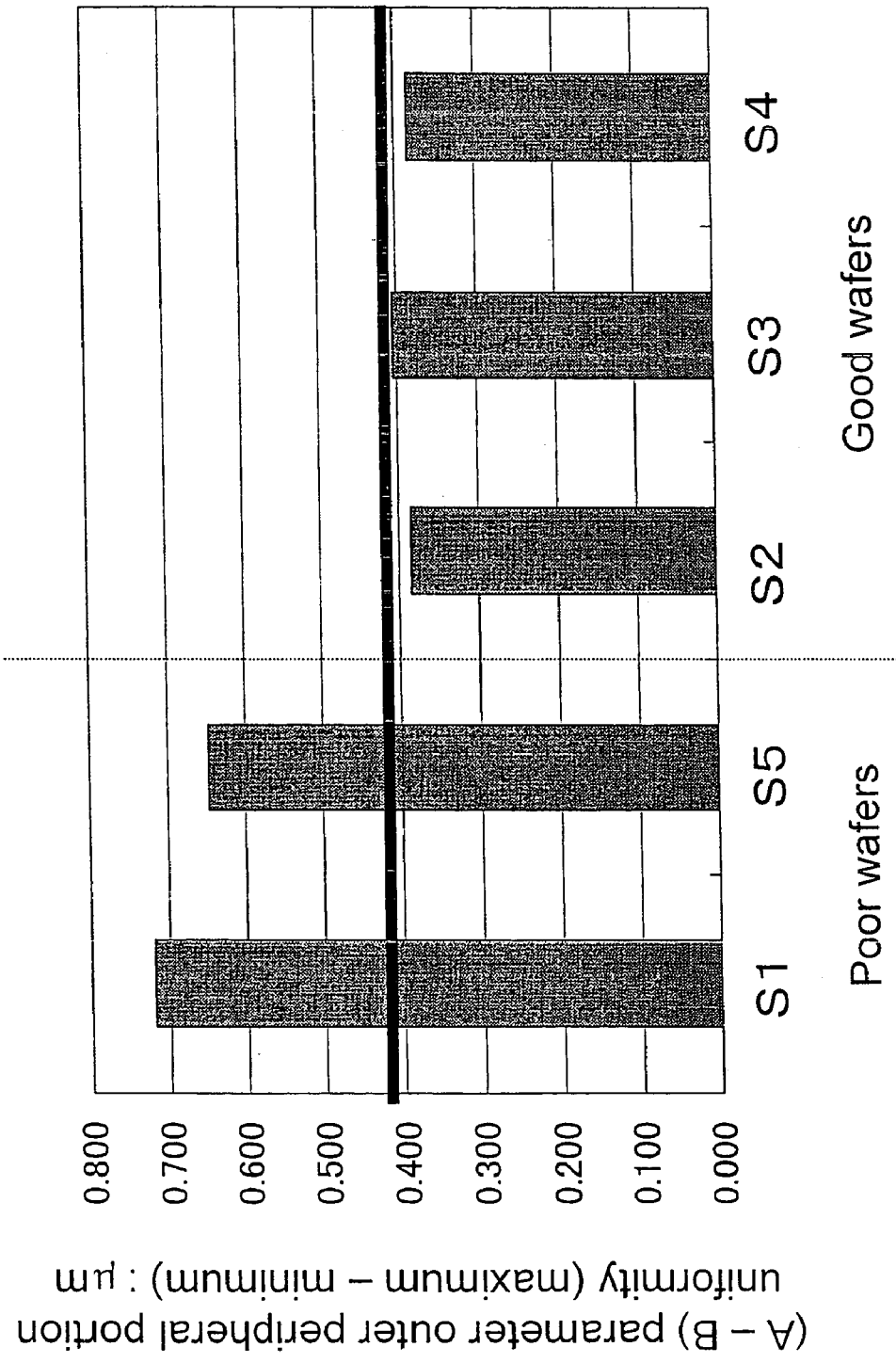
FIG. 10 is a graph showing (A–B) parameter peripheral portion uniformity in each of the wafers S1 to S5.

As for wafers S1 to S5, there are shown the peripheral portion uniformity (the maximum value–the minimum value) in the B parameter in FIG. 9 and the peripheral portion uniformity (the maximum value–the minimum value) in the (A–B) parameter in FIG. 10. It is found that a wafer with the B parameter peripheral portion uniformity of 600 nm or less is good and a wafer with the (A–B) parameter peripheral portion uniformity of 500 nm or less is good.

Example 3

Even in the wafer manufacturing process shown in Example 2, the B parameter uniformity was not able to be reduced to be perfectly 600 nm or less. Accordingly, wafers were evaluated according to the configuration evaluation method of the present invention to sorted wafers within the scope of the present invention and thereafter, the sorted wafers were loaded into a device process. To be concrete, wafers having the surface characteristic B peripheral portion uniformity of 600 nm or less (these wafers had the surface characteristic (A–B) peripheral portion uniformity of 400 nm or less) were loaded into a stepper process and operations of the stepper were observed. As a result, it was confirmed that the stepper was not stopped at all.

Comparative Example 2

Wafers manufactured in a common wafer manufacturing process were loaded into a stepper process without sorting of the wafers. As a result, abnormal stop of the stepper was observed. Stop of the apparatus occurred at a frequency of the order of 10% of processed wafers. Evaluation on a wafer causing abnormality according to the present invention shows that the wafer peripheral portion uniformity in the surface characteristic B was 600 nm or more. Moreover, the wafer peripheral portion uniformity in the surface characteristic (A–B) (the maximum value–the minimum value) was also 600 nm or more. Note that abnormal stop occurred or did not occur for wafers having the peripheral portion uniformity in the surface characteristic B of the order in the range of 500 nm to 700 nm. When this value is 600 nm or less, an occurrence frequency of the apparatus stop is greatly reduced, whereas there was a case where preferable wafers were not sorted precisely with the B parameter alone. By evaluating wafers with the peripheral portion uniformity in the surface characteristic (A–B), the wafers are controlled more precisely. Especially, wafers with this value of the order of 400 nm or less cause no abnormal stop.

There is a case where abnormal stop does not occur for a wafer having the peripheral portion uniformity in the B parameter of 600 nm or more and therefore, while it is not necessarily conceived that the cause for stop of a stepper is limited to the above factors, it may be conceived in view of the above matter that the factors evaluated in the present invention exert a large influence thereon.

That is to say, in the stepper process, the peripheral portion uniformity in the B parameter is especially important and it is found that abnormal stop of the apparatus is reduced using wafers with (the maximum value–the minimum value) of 600 nm or less among the peripheral portion configuration uniformity. Using wafers with (the maximum value–the minimum value) in the (A–B) parameter uniformity of 400 nm or less, stop of the apparatus is greatly reduced, resulting in improvement on a product yield as well.

Furthermore, in evaluation of the peripheral portion uniformity, stable evaluation was ensured when an arbitrary position X of the evaluation method of the present invention is set at a position of 30 mm from the wafer peripheral portion and measurement of the wafer configuration is performed using date obtained from an area excluding 1 mm of the wafer periphery (excluding a chamfered portion).

CAPABILITY OF EXPLOITATION IN INDUSTRY

Typical effects of the present invention will be described below. Displacement or a thickness measured with a prescribed space using a displacement or thickness measuring means can define a wafer configuration more precisely by using a surface characteristic calculating means than a conventional index indicating flatness such as SFQR. Especially, since the peripheral portion uniformity in the B parameter can be quantitatively evaluated, it can be determined surely whether a wafer is good or poor on a prescribed criterion.

In the configuration evaluation method of the present invention, quality that has not been precisely evaluated until now, especially quality of a peripheral portion configuration of a wafer can be quantitatively evaluated, and thereby a wafer configuration most suitable for lithography can be defined.

By defining wafers with values of peripheral portion uniformity in the B parameter and the (A–B) parameter (the maximum value–the minimum value of evaluated values), preferable wafers for a device process can be sorted.

By using the surface characteristic obtained according to the wafer configuration evaluation method of the present invention, evaluation can be more precisely than conventional wafer configuration evaluation and hence abnormality in a device process is prevented, resulting in improvement on a product yield.

What is claimed is:

1. A method for evaluating a wafer configuration comprising the steps of:
    obtaining plural wafer configuration profiles of from the central portion of a wafer to the edge portion thereof along the entire periphery thereof at a prescribed angular space;
    providing a first region for calculating a reference line for each of the profiles in the central side of the wafer;
    calculating the reference line in the first region;
    further providing a second region in the peripheral side of the wafer outside the first region;
    extrapolating the reference line calculated in the first region to the second region;
    analyzing a value (an actually measured value–a reference value) obtained by subtracting the reference line (the reference value) in the second region from a configuration (the actually measured value) in the second region;
    calculating the maximum value among the values as a surface characteristic A and the minimum value among the values as a surface characteristic B; and
    evaluating configuration uniformity in the peripheral portion of the wafer from plural surface characteristics A and surface characteristics B obtained along the entire peripheral portion of the wafer.

2. The method for evaluating a wafer configuration according to claim 1, wherein the configuration uniformity in the peripheral portion of the wafer is evaluated from a difference between the maximum value and the minimum value of the plural surface characteristics A obtained in the peripheral portion of the wafer.

3. The method for evaluating a wafer configuration according to claim 1, wherein the configuration uniformity in the peripheral portion of the wafer is evaluated from a difference between the maximum value and the minimum value of the plural surface characteristics B obtained in the peripheral portion of the wafer.

4. The method for evaluating a wafer configuration according to claim 1, wherein a difference (a surface characteristic (A–B)) between the surface characteristic A and the surface characteristic B is obtained from each of the profiles, and the configuration uniformity in the peripheral portion of the wafer is evaluated from a difference between the maximum value and the minimum value of the plural surface characteristics (A–B) obtained in the peripheral portion of the wafer.

5. The method for evaluation a wafer configuration according to claim 1, wherein the configuration uniformity in the peripheral portion of the wafer is evaluated with standard deviations of plural surface characteristics A, surface characteristics B or differences therebetween (surface characteristics (A–B)) obtained in the peripheral portion of the wafer.

6. The method for evaluating a wafer configuration according to claim 1, wherein the wafer configuration profile is a value measured with a prescribed space within a surface of the wafer, and displacement in the direction vertical to the wafer surface or a thickness of the wafer.

7. The method for evaluating a wafer configuration according to claim 6, wherein the prescribed space for measurement is 1 mm or less.

8. The method for evaluating a wafer configuration according to claim 1, wherein the prescribed angular space to obtain the wafer configuration profiles is 1 degree or less.

9. A wafer evaluated by the method for evaluating a wafer configuration according to claim 1, wherein a difference between the maximum value and the minimum value of plural surface characteristics B obtained within a surface of the wafer (the B parameter peripheral portion uniformity) is 600 nm or less.

10. A wafer evaluated by the method for evaluating a wafer configuration according to claim 1, wherein a difference between the maximum value and the minimum value of plural surface characteristics (A–B) obtained within a surface of the wafer (the (A–B) parameter peripheral portion uniformity) is 500 nm or less.

11. The wafer according to claim 10, wherein a difference between the maximum value and the minimum value of plural surface characteristics (A–B) obtained within the wafer surface (the (A–B) parameter peripheral portion uniformity) is 400 nm or less.

12. A wafer sorting method, wherein there are sorted wafers each having a difference between the maximum value and the minimum value of plural surface characteristics B (the B parameter peripheral portion uniformity) of 600 nm or less evaluated by the method for evaluating a wafer configuration according to claim 1, the sorted wafers being used in an exposure system.

13. A wafer sorting method, wherein there are sorted wafers each having a difference between the maximum value and the minimum value of plural surface characteristics (A–B) (the (A–B) parameter peripheral portion uniformity) of 500 nm or less evaluated by the method for evaluating a wafer configuration according to claim 1, the sorted wafers being used in an exposure system.

14. The wafer sorting method according to claim 13, wherein there are sorted wafers each having a difference between the maximum value and the minimum value of plural surface characteristics (A–B) (the (A–B) parameter peripheral portion uniformity) of 400 nm or less.

* * * * *